US010035611B2

(12) United States Patent
Holtet et al.

(10) Patent No.: US 10,035,611 B2
(45) Date of Patent: Jul. 31, 2018

(54) METHOD AND DEVICE FOR AUTOMATIC PACKING OF WOOD

(71) Applicant: VEPAK AS, Trondheim (NO)

(72) Inventors: Ole Jansen Holtet, Trondheim (NO); Morten Hvistendahl Evensmo, Oslo (NO); Jørgen Møinichen, Oslo (NO); Geir Turtum, Hosle (NO); Lars Martin Ranheim, Trondheim (NO); Jon-Arne Pedersen, Drammen (NO); Elias Bjørne, Oslo (NO); Johannes Hatle Lundgaard, Trondheim (NO); Peter Richard Britton, Trondheim (NO); Fredrik Johansen, Jakobsli (NO)

(73) Assignee: VEPAK AS, Trondheim (NO)

( * ) Notice: Subject to any disclaimer, the term of this patent is extended or adjusted under 35 U.S.C. 154(b) by 0 days.

(21) Appl. No.: 15/503,992

(22) PCT Filed: Aug. 14, 2015

(86) PCT No.: PCT/EP2015/068768
§ 371 (c)(1),
(2) Date: Feb. 20, 2017

(87) PCT Pub. No.: WO2016/024016
PCT Pub. Date: Feb. 18, 2016

(65) Prior Publication Data
US 2017/0275029 A1   Sep. 28, 2017

(30) Foreign Application Priority Data

Aug. 14, 2014  (GB) .................................. 1414437.2
Feb. 11, 2015  (GB) .................................. 1502222.1
May 14, 2015  (GB) .................................. 1508249.8

(51) Int. Cl.
B27B 25/04   (2006.01)
B65B 35/32   (2006.01)
(Continued)

(52) U.S. Cl.
CPC .............. *B65B 5/067* (2013.01); *B27B 25/04* (2013.01); *B65B 35/246* (2013.01); *B65B 35/32* (2013.01);
(Continued)

(58) Field of Classification Search
CPC ...... B66B 23/024; B66B 23/026; B66B 21/10; B66B 21/02; B66B 23/12; F16G 13/02;
(Continued)

(56) References Cited

U.S. PATENT DOCUMENTS 2,779,363 A   1/1957  Laughton
3,545,630 A   12/1970  Invanto
(Continued)

FOREIGN PATENT DOCUMENTS

AU   2005205832 A1   3/2006
BE      1012090 A3    4/2000
(Continued)

OTHER PUBLICATIONS

Feb. 13, 2015 (GB)—Search Report—App GB1414437.2.
(Continued)

*Primary Examiner* — Mark A Deuble
(74) *Attorney, Agent, or Firm* — Banner & Witcoff, Ltd.

(57) ABSTRACT

A method of preparing wood for packing comprises: loading wood lengthwise into a conveyor system; conveying the wood pieces one-by-one onto a loading hatch in a predetermined orientation; when a wood piece is fully on the loading hatch, opening the loading hatch and dropping the wood piece in the predetermined orientation into a measuring compartment; repeating the conveying and dropping process (Continued)

so that multiple wood pieces are stacked in the same orientation in the measuring compartment; and, when a required amount of stacked wood is within the measuring compartment, dropping the stacked wood pieces into a packing area.

20 Claims, 5 Drawing Sheets

(51) Int. Cl.
| | |
|---|---|
| A01G 23/00 | (2006.01) |
| B65G 47/38 | (2006.01) |
| B65B 5/06 | (2006.01) |
| B65B 35/24 | (2006.01) |
| B65G 57/06 | (2006.01) |
| B27L 7/00 | (2006.01) |
| B65B 35/12 | (2006.01) |
| B65B 25/02 | (2006.01) |

(52) U.S. Cl.
CPC ............. *B65G 47/38* (2013.01); *B65G 57/06* (2013.01); *A01G 23/00* (2013.01); *B27L 7/00* (2013.01); *B65B 25/02* (2013.01); *B65B 35/12* (2013.01)

(58) Field of Classification Search
CPC ......... F16G 15/12; B65G 47/38; B65G 57/03; B65G 57/06
USPC .............................................. 198/418.6, 431
See application file for complete search history.

(56) References Cited

U.S. PATENT DOCUMENTS

| | | | |
|---|---|---|---|
| 3,696,948 A | 10/1972 | Murdoch et al. | |
| 3,776,379 A * | 12/1973 | Harvey | B07C 5/14 |
| | | | 209/518 |
| 4,098,407 A * | 7/1978 | Moore | B07C 5/14 |
| | | | 209/517 |
| 4,205,751 A | 6/1980 | Rysti | |
| 4,290,722 A | 9/1981 | Rysti et al. | |
| 4,742,920 A | 5/1988 | Doherty | |
| 4,871,059 A | 10/1989 | Rantanen et al. | |
| 5,632,383 A | 5/1997 | Bailey | |
| 7,826,921 B2 * | 11/2010 | Kellam | G06Q 10/06 |
| | | | 144/41 |
| 2003/0034224 A1 | 2/2003 | Bernard et al. | |
| 2008/0257686 A1 | 10/2008 | Freudelsperger | |
| 2009/0026017 A1 | 1/2009 | Freudelsperger | |

FOREIGN PATENT DOCUMENTS

| | | |
|---|---|---|
| CN | 203186656 U | 9/2013 |
| DE | 4330025 A1 | 3/1994 |
| DE | 10200032919 A1 | 12/2007 |
| DE | 202009014960 U1 | 4/2010 |
| EP | 2314530 A2 | 4/2011 |
| GB | 644498 A | 10/1950 |
| JP | S59124629 A | 7/1984 |
| JP | 2000025891 A | 1/2000 |
| JP | 2003245610 A | 9/2003 |
| SE | 1100065 A1 | 7/2012 |
| SU | 1744012 A1 | 6/1992 |
| WO | 2015036702 A1 | 3/2013 |

OTHER PUBLICATIONS

Aug. 22-24, 2014—Three screen shots of BLI Pilotkunde.
Oct. 21, 2015—(WO) International Search Report and Written Opinion—App PCT/EP2015/068768.

\* cited by examiner

METHOD AND DEVICE FOR AUTOMATIC PACKING OF WOOD

CROSS-REFERENCE TO RELATED APPLICATIONS

The present application is a U.S. National Phase of International Application No. PCT/EP2015/068768, filed on Aug. 14, 2015, designating the United States of America, and claims priority to British Patent Application No. 1414437.2, filed Aug. 14, 2014, British Patent Application No. 1502222.1, filed Feb. 11, 2015 and British Patent Application No. 1508249.8, filed May 14, 2015. This application claims priority to and the benefit of the above-identified applications, each of which is fully incorporated by reference herein.

The present invention relates to a method of automatically preparing wood for packing and to an apparatus for preparing wood for packing. The wood may, for example, be firewood.

As with any product sold commercially, it is important to be able to package wood in a manner that controls the packing volume, so that the wood can be stored and transported efficiently; and controls the amount of wood, so that packages contain a set amount of wood and can be sold as known quantities of wood. Different challenges arise for different types of wood depending on the shape and size of the wood, as well as on the variation in shape and size.

U.S. Pat. No. 4,871,059 discloses a known apparatus for dividing a supply of wood pieces into batches for later grinding. The wood pieces, for example logs, are aligned parallel to one another piled up on two conveyors, which feed wood toward a central aperture. The wood pieces are allowed to fall through the aperture until a set batch size has been created, after which the aperture is blocked by gripper members to prevent further wood pieces from falling. The batch thus created can be moved forward to the grinding matching, and another batch can then be formed.

Whilst this apparatus is effective for logs with a round cross-section it may be blocked when less regular shapes are used, such as split logs as used for firewood and the like. In addition, although this apparatus is well suited for making large batches of wood for use in an industrial wood processing plant, it is not possible to create smaller bundles of wood, such as the bundles often used for supply of firewood for use in domestic wood burners and open fires. The batches of wood are also not provided in a form that can be easily packaged, for example into a bag.

EP 2314530 discloses a device for stacking wooden logs onto a pallet. A conveyor belt with paddles is used to pick up logs one-by-one, with the length of the logs generally perpendicular to the direction of travel. The conveyor is vibrated to correctly align the logs. The aligned logs are dropped onto to another conveyor which loads them onto a third conveyor to fill it up piece by piece with a row of parallel logs. When the third conveyor is full, the logs are pressed together by a slider and then slide onto a transfer plate, which is used to transfer the line of logs onto a pallet to form a first layer of logs on the pallet. A new line of logs is then formed and becomes the second layer of logs on the pallet. In this way a pallet is filled with an ordered stack of logs.

However, this apparatus is also not well suited for use with irregular shaped wood such as split logs. Furthermore, it is not capable of producing packed wood in small quantities. Hence, in the prior art mentioned above there is no automated system for preparing irregular shaped wood for packing. Manual systems for this purpose exist. These might typically involving a sheath for holding open a bag as it is filled manually, with the sheath then being removed after filling. There are also systems that use a cradle to hold the required small bundle of wood pieces, which can then be wrapped to complete the package of wood. However, such systems involve a large degree of manual effort and may not provide sufficient accuracy in the amount of wood.

Thus, there is a need for an effective automated system for preparing wood for packing, including wood of irregular cross-section such as split logs, and a need for a system that is suitable for packing wood in small bundles such as the bundles used for firewood for domestic use.

Viewed from a first aspect the invention provides a method of preparing wood for packing, wherein the wood consists of wood pieces having a length and a cross-section with smaller dimensions than the length, the method comprising: loading wood lengthwise into a conveyor system; conveying the wood pieces one-by-one onto a loading hatch in a predetermined orientation; when a wood piece is fully on the loading hatch, opening the loading hatch and dropping the wood piece in the predetermined orientation into a measuring compartment; repeating the conveying and dropping process so that multiple wood pieces are stacked in the same orientation in the measuring compartment; and, when a required amount of stacked wood is within the measuring compartment, dropping the stacked wood pieces into a packing area.

With this system relatively small numbers of wood pieces can be aligned and stacked ready for packing into a bag or similar. Since the wood pieces are conveyed lengthwise and dropped one-by-one through the loading hatch in the predetermined orientation then the method is effective with any cross-section of the wood, including mixes of different cross-sectional shapes and sizes as found with split logs of the type used for firewood. The required amount of wood, as measured by the measuring compartment, can be a fairly small bundle, as used for providing firewood for domestic use to be sold at retail outlets such as garages and grocery stores. In the preferred embodiments the required amount of wood is less than 60 liters, or less than 30 kg of dry wood. The required amount may be an amount less than 50 liters, or less than 40 liters, for example 30 liters or less. In one example the required amount is about 20 liters or about 7.5 kg of dry wood.

It is preferred for the wood pieces to be provided with about the same length, for example a length that is within 10% or less of a maximum length. It is typical for wood such as firewood to be provided on this basis and the method is suited for efficiently packing wood that is provided in roughly equal lengths.

In a preferred embodiment the measuring compartment has footprint similar to the footprint of the packing area. The packing area may include a bag rack or the like, such as a sheath where a bag can be mounted about the outside of the sheath, the wood can be placed into the sheath (in this case it is dropped from the measuring compartment) and the bag can be withdrawn from the sheath with the stacked wood packed inside. The measuring compartment may have a hatch for dropping the wood pieces into the packing area. The method may include determining when the required amount of wood pieces is stacked in the measuring compartment by using one or more sensors, for example a weight sensor to measure a required weight of wood, or an optical sensor to measure when the measuring compartment is filled to a certain level indicating that a required volume of wood is present.

The method may include sliding the wood pieces lengthwise along a channel to load the conveyor system. The channel is preferably shaped to guide the wood pieces and prevent them from leaving the lengthwise orientation. Thus, the channel may be a V-shaped channel and/or the channel may have side walls that are spaced apart by a distance that is less than the length of the wood pieces, preferably a distance that is only a small amount larger than the maximum width of the wood pieces. It will be noted that a V-shaped channel can advantageously be used with wood pieces having a range of widths and still hold them securely in a lengthwise orientation as they slide. Thus, a V-shaped channel is preferred. The V-shaped channel may have a cross-section that is a complete V, or it may be a truncated V-shape. The use of a truncated V-shape can allow for easier sliding of the wood pieces, and also may assist in ensuring that the wood pieces slide one-by-one, since if two pieces are side-by-side in the channel then one piece may fall over the sidewalls.

The channel may be sloped downwards so that the wood pieces slide under the influence of gravity. That avoids the need for a mechanism to propel the wood pieces. Alternatively, the channel may be a conveyor channel including a conveyor element to move the wood pieces onto the conveyor system, preferably a conveyor element combined with a downward sloping channel such that the conveyor element provides mechanical assistance to sliding of the wood pieces under the influence of gravity. A preferred arrangement for a channel that includes a conveyor element is a V shaped conveyor channel wherein one wall of the V is a static wall and the other wall of the V is a conveyor wall. The conveyor wall may be a moving surface of a conveyor such as a belt conveyor. Thus, the channel may comprise a static wall and a conveyor wall angled against one another and meeting at a vertex to form a V shape. In a further alternative arrangement the channel is a three-part channel with a first downwardly sloped section, followed by flatter, less sloped section, and then followed by a second downwardly sloped section. This can aid in minimising the risk that more than one wood piece is slid down the channel at once, since if there are several wood pieces side-by-side then it is likely that all but one will be dislodged as the wood slides on to the flatter section. Advantageously, the flatter section and the second downwardly sloped section may have relatively low sidewalls, for example sidewalls lower than the walls of the first downwardly sloped section. The sidewalls may have a height less than the average width of the wood pieces. The height may be a half of the average width of the wood pieces, or less. In a typical case, the height of the sidewalls may be 40 mm or less, preferably 30 mm or less. The use of lower sidewalls may aid further in allowing excess wood to fall off, leaving just single pieces aligned lengthwise one-by-one.

In one example method the channel is loaded by sliding the wood pieces from a hopper via guide plates to the top of the channel, so that the wood pieces may enter the channel one-by-one in the lengthwise orientation. In a preferred arrangement the wood pieces are supplied from a waste extraction machine for cleaning unwanted material from the wood, as described below.

As an alternative to a sloped channel, there may be a generally horizontal pre-loading conveyor with relatively low sidewalls, for example sidewalls with a height as described above in relation to the flattened section of the three-part channel, and this pre-loading conveyor may supply wood pieces to the loading conveyor system. The pre-loading conveyor may use low side walls to allow for any side-by-side wood pieces to be separated by one piece falling off the conveyor as explained above for the three-part channel. The pre-loading conveyor is preferably made of a relatively low friction material, which should be a material of lower friction than the loading conveyor system, in order that wood pieces can be 'queued up' along the pre-loading conveyor as they wait to pass on to the loading conveyor system. In one example the pre-loading conveyor can be a plastic material.

The conveyor system is preferably arranged for maintaining a lengthwise alignment of the wood pieces and for separating the wood pieces from one another so that there is a gap between the trailing end of a first wood piece and the leading end of a second wood piece. The lengthwise alignment of the wood pieces may be maintained by the shape of the conveyor system and/or by sidewalls along the conveyor system. In one example the conveyor belt has a U-shape.

A gap between the wood pieces makes it easier to load the wood pieces one-by-one onto the hatch. Separating the wood pieces may be achieved in various possible ways.

One preferred approach for the conveyor system is to have a first, loading conveyor operating at a first speed, with a second separating conveyor operating at a second speed, the second speed being higher than the first speed. With this approach the method may include conveying wood pieces with a relatively small spacing on the first conveyor at the first speed, and transferring the wood pieces onto the second conveyor at the second, higher, speed, such that the wood pieces have an increased spacing on the second conveyor compared to on the first conveyor. The increase spacing arises since when a first wood piece is taken onto the second conveyor it moves away from the second wood piece at a greater speed than the speed of travel of the second wood piece. When the second wood piece reaches the second conveyor the first piece has already moved away to create the required gap.

Another preferred approach is to load the conveyor system by sliding the wood pieces along a channel that is at an angle to the conveyor system in the vertical plane. The angle should be less than 180 degrees, and may be in the range 100-140 degrees. For example, the channel may be sloped downwardly and/or the conveyor system may be sloped upwardly. The angle between the channel and the conveyor system means that a second wood piece cannot engage with the conveyor system until a preceding first wood piece has moved along the conveyor. Thus, a gap is automatically formed between the wood pieces. This effect is amplified when an upwardly sloping conveyor is used along with a downwardly sloping channel, since the angle between the channel and the conveyor system is increased. Thus the method preferably includes using a downwardly sloping channel to load wood pieces one-by-one onto a conveyor system that is slanted at an upward angle in the direction of travel. Conveniently and advantageously, the channel used to load the conveyor system may be a channel selected from the various types described above, which is also used to provide and maintain the lengthwise orientation of the wood pieces.

Both these approaches may be used together. Hence, one particularly useful example method includes using a downward channel to load a first, loading, conveyor, which preferably has an upward slant, and then passing the wood pieces from the loading conveyor to a second, separating conveyor that is operated at a higher speed than the loading conveyor in order to increase the spacing. The separating conveyor may then be used to convey the wood pieces one-by-one to the loading hatch.

Another alternative arrangement is to use a horizontal channel to load an upwardly slanting conveyor system, although this is less preferred since then a further mechanism is required to propel the wood pieces along the channel.

The loading hatch may drop the wood pieces directly into the measuring compartment, which is a simple arrangement using few moving parts. A direct loading of the measuring compartment may however require the conveyor system to be paused to avoid a new wood piece being inadvertently dropped from the loading hatch when the required amount of stacked wood pieces are ready below. Thus, in one useful arrangement the method includes using a buffer compartment beneath the loading hatch and above the measuring compartment. The method may use the buffer compartment to provide a buffer for temporary storage of any wood pieces that are passed along the conveyor system and through the loading hatch after the required quantity of wood is stacked in the measuring compartment. This means that the conveyor system can operate continually and the measuring compartment can also operate without interruption. One possible method involves using the buffer compartment to store wood pieces when the measuring compartment has been filled with the required amount of wood, and releasing the stored wood pieces from the buffer compartment into the measuring compartment once the measuring compartment has emptied the previous batch of stacked wood pieces into the packaging area.

The buffer compartment may have a hatch for opening and closing the compartment. In this case, the method may include closing the buffer compartment hatch when the measuring compartment has been filled with the required amount, and then opening the buffer compartment hatch when the measuring compartment has been emptied and is ready for the next batch.

Preferably the loading hatch has a door comprising two flaps opening in a V-shape. This has been found to drop the wood piece with a stable orientation, so that it remains in the orientation that it was supplied to the hatch. This predetermined orientation may be a lengthwise orientation such that the door of the hatch opens along a hinge parallel with the length of the wood piece. The V-shape of the loading hatch flaps may be a truncated V-shape, and in a preferred arrangement the shape is similar to the shape of the downward channel. A truncated V-shape, i.e. a V with a flat at the base, can aid the sliding motion of wood pieces from the conveyor system onto the loading hatch. The measuring compartment hatch and/or buffer compartment hatch, where present, preferably have a door with a hinge or hinges parallel with the length of the wood pieces and the door may be in the form of a pair of flaps opening in a V shape. For the measuring compartment hatch and buffer compartment hatch since the wood pieces arrive at the hatch by falling rather than sliding then there is no particular need for a truncated V-shape as for the loading hatch. Hence, the V-shape for these hatches may be a fully pointed V.

As noted above, a waste extraction machine may be present. Such a machine may be used before the wood is loaded onto the conveyor system in order to remove waste from the wood pieces. The waste may, for example, include dirt, loose wood and bark chips, and/or other unwanted material attached to the wood pieces. In a preferred arrangement the method uses the waste extraction machine to receive the wood pieces from a hopper, to remove waste material, and to load the wood pieces onto the conveyor system, optionally via the channel described above. The waste extraction machine may usefully also provide a preliminary separation of the wood pieces to allow them to be loaded in a lengthwise orientation without risk of jamming.

In one arrangement the waste extraction machine comprises a conveyor with voids along the conveyor for waste material to fall through. The waste material may be dislodged by the movement of the wood pieces along the conveyor. Preferably the conveyor of the waste extraction machine is arranged to agitate the wood pieces as they travel along it, in order to accelerate the dislodging of waste material. One useful arrangement uses rotors spaced apart along a sequence of axles, where the rotors rotate to propel the wood pieces along the machine from axle to axle, and also act to bounce the wood pieces up and down as they pass between rotors. It is useful for the axles further along the direction of travel of the wood pieces to be rotated at increasing speed compared to the rotors further back. This helps in separating the wood pieces from one another. In some examples the bouncing motion can be increased by the use of rotors with a non-circular shape. Any waste material that is dislodged from the wood pieces can fall through gaps between the rotors and between the axles. The rotors can be plates with, for example, a hexagonal or octagonal shape. The corners of this type of polygonal rotors will push the wood pieces up to agitate them and push them along the machine toward the conveyor system or channel. Other shapes could be used for the rotors.

Viewed from a second aspect the invention provides an apparatus for preparing wood for packing, wherein the wood consists of wood pieces having a length and a cross-section with smaller dimensions than the length, the apparatus comprising: a loading mechanism for loading wood lengthwise onto a conveyor system; a hatch for receiving wood pieces one-by-one from the conveyor system; and a measuring compartment for receiving wood pieces dropped through the hatch; wherein the conveyor system is for conveying the wood pieces one-by-one onto the loading hatch in a predetermined orientation; wherein the apparatus is arranged so that when a wood piece is fully on the loading hatch, then the loading hatch is opened and drops the wood piece in the predetermined orientation into the measuring compartment; such that the measuring compartment can be filled with multiple wood pieces stacked in the same orientation when the conveying and dropping process is repeated; and wherein the measuring compartment is operable so that, when a required amount of wood is stacked within the measuring compartment, the stacked wood pieces are dropped into a packing area.

The apparatus may have features as described above in connection with the method of the first aspect, and these features may be for the purpose described above and provide similar advantages.

Thus, the measuring compartment may have a footprint similar to the footprint of the packing area. The packing area may include a bag rack or the like, such as a sheath where a bag can be mounted about the outside of the sheath, the wood can be placed into the sheath (in this case it is dropped from the measuring compartment) and the bag can be withdrawn from the sheath with the stacked wood packed inside. The measuring compartment may have a hatch for dropping the wood pieces into the packing area. The apparatus may be arranged to determine when the required amount of wood pieces is stacked in the measuring compartment and may, for example, include one or more sensors as discussed above.

The apparatus may include a channel for lengthwise sliding of the wood pieces to load the conveyor system. The channel may be shaped to guide the wood pieces and prevent them from leaving the lengthwise orientation. Thus, the channel may be a V-shaped channel and/or the channel may have side walls that are spaced apart by a distance that is less than the length of the wood pieces, preferably a distance that is only a small amount larger than the maximum width of the wood pieces.

The channel may be sloped downwards toward the start of the conveyor system so that the wood pieces slide under the influence of gravity. Alternatively, the channel may be a conveyor channel including a conveyor element to move the wood pieces onto the conveyor system, preferably a conveyor element combined with a downward sloping channel such that the conveyor element provides mechanical assistance to sliding of the wood pieces under the influence of gravity. A preferred arrangement for a channel that includes a conveyor element is a V shaped conveyor channel wherein one wall of the V is a static wall and the other wall of the V is a conveyor wall. The conveyor wall may be a moving surface of a conveyor such as a belt conveyor. Thus, the channel may comprise a static wall and a conveyor wall angled against one another and meeting at a vertex to form a V shape.

In another alternative arrangement the channel is a three-part channel with a first downwardly sloped section, followed by flatter, less sloped section, and then followed by a second downwardly sloped section. The flatter section and the second downwardly sloped section may have relatively low sidewalls, for example sidewalls that are lower than the sidewalls of the first downwardly sloped section. The sidewalls may have a height less than the average width of the wood pieces. The height may be a half of the average width of the wood pieces, or less. In a typical case, the height of the sidewalls may be 40 mm or less, preferably 30 mm or less.

In one example the apparatus includes a hopper and guide plates for loading the channel with the wood pieces one-by-one in the lengthwise orientation. In a preferred arrangement the wood pieces are supplied from a waste extraction machine for cleaning unwanted material from the wood, as described below.

As an alternative to a sloped channel, there may be a generally horizontal pre-loading conveyor with relatively low sidewalls, for example sidewalls with a height as described above in relation to the flattened section of the three-part channel, and this pre-loading conveyor may supply wood pieces to the loading conveyor system. The pre-loading conveyor is preferably made of a relatively low friction material, as discussed above.

The conveyor system is preferably arranged for maintaining a lengthwise alignment of the wood pieces and for separating the wood pieces from one another so that there is a gap between the trailing end of a first wood piece and the leading end of a second wood piece. The conveyor system may include sidewalls for keeping the wood pieces aligned and/or it may be shaped to guide and align the wood pieces. One example uses a U-shaped conveyor belt.

One preferred conveyor system includes a first, loading conveyor operating at a first speed, with a second separating conveyor operating at a second speed, the second speed being higher than the first speed. Another preferred arrangement includes a channel for loading the conveyor system, wherein the wood pieces are slid along the channel and the channel is at an angle to the conveyor in the vertical plane as discussed above. The channel may be downwardly sloping in the direction of travel of the wood pieces. Optionally, this arrangement may also use a conveyor that is slanted at an upward angle in the direction of travel. The channel used to load the conveyor may be a channel selected from the channels described above.

Both these approaches may be used together. Hence, one particularly useful example apparatus includes a downward channel for loading lengthwise wood pieces onto a first, loading, conveyor, which preferably has an upward slant, wherein the loading conveyor is for passing the wood pieces to a second, separating conveyor in order to increase the spacing. The separating conveyor operates at a higher speed than the loading conveyor.

The loading hatch may be arranged to drop the wood pieces directly into the measuring compartment. Alternatively, in one useful arrangement the apparatus includes a buffer compartment beneath the loading hatch and above the measuring compartment. The buffer compartment may be for temporary storage of any wood pieces that are passed along the conveyor system and through the loading hatch after the required quantity of wood is stacked in the measuring compartment. The apparatus may be arranged so that the buffer compartment stores wood pieces when the measuring compartment has been filled with the required amount of wood, and releases the stored wood pieces from the buffer compartment into the measuring compartment once the measuring compartment has emptied the previous batch of stacked wood pieces into the packaging area. One example arrangement for achieving this is for the buffer compartment to have a hatch for opening and closing the compartment. In this case, apparatus may be arranged to close the buffer compartment hatch when the measuring compartment has been filled with the required amount, for example when a sensor indicates that the required amount is present, and then to open the buffer compartment hatch when the measuring compartment has been emptied and is ready for the next batch, for example when a sensor indicates that no wood is present in the measuring compartment.

Preferably the loading hatch has a door comprising two flaps opening in a V-shape, which may be a truncated V-shape. As with the method above, the predetermined orientation of the wood pieces may be a lengthwise orientation such that the door of the hatch opens along a hinge parallel with the length of the wood piece. The measuring compartment hatch and/or buffer compartment hatch, where present, preferably have a door with a hinge or hinges parallel with the length of the wood pieces and the door may be in the form of a pair of flaps opening in a V shape.

A waste extraction machine may be included in the apparatus for removing waste from the wood pieces before they are loaded onto the conveyor system. In a preferred arrangement the apparatus includes a hopper for supplying wood to the waste extraction machine, and the waste extraction machine is for supplying wood pieces to the conveyor system, optionally via the channel described above. The waste extraction machine may usefully be arranged to provide a preliminary separation of the wood pieces to allow them to be loaded in a lengthwise orientation without risk of jamming.

In one arrangement the waste extraction machine comprises a conveyor with voids along the conveyor for waste material to fall through. Preferably the conveyor of the waste extraction machine is arranged to agitate the wood pieces as they travel along it. One useful arrangement uses rotors spaced apart along a sequence of axles, wherein the rotors rotate to propel the wood pieces along the machine from axle to axle, and also act to bounce the wood pieces up and down as they are passed between the sets of rotors. The axles further along the machine in the direction of travel may be rotated at increasing speeds. The bouncing motion may be increased by the use of rotors with a non-circular shape. Any waste material that is dislodged from the wood pieces can fall through gaps between the rotors and between the axles. The rotors can be plates with, for example, a hexagonal or an octagonal shape. The corners of this type of polygonal rotors will push the wood pieces up to agitate them and push them along the machine toward the conveyor system or channel. Other shapes could be used for the rotors.

Certain preferred embodiments of the invention will now be described by way of example only and with reference to the accompanying drawings, in which:

FIG. 5 is a perspective view of a V shaped conveyor channel that may be used in place of the V shaped channel in the FIG. 1 apparatus or the FIG. 4 apparatus; and FIG. 6 is a view of the V shaped conveyor channel of FIG. 5 shown end on.

Figure 1:
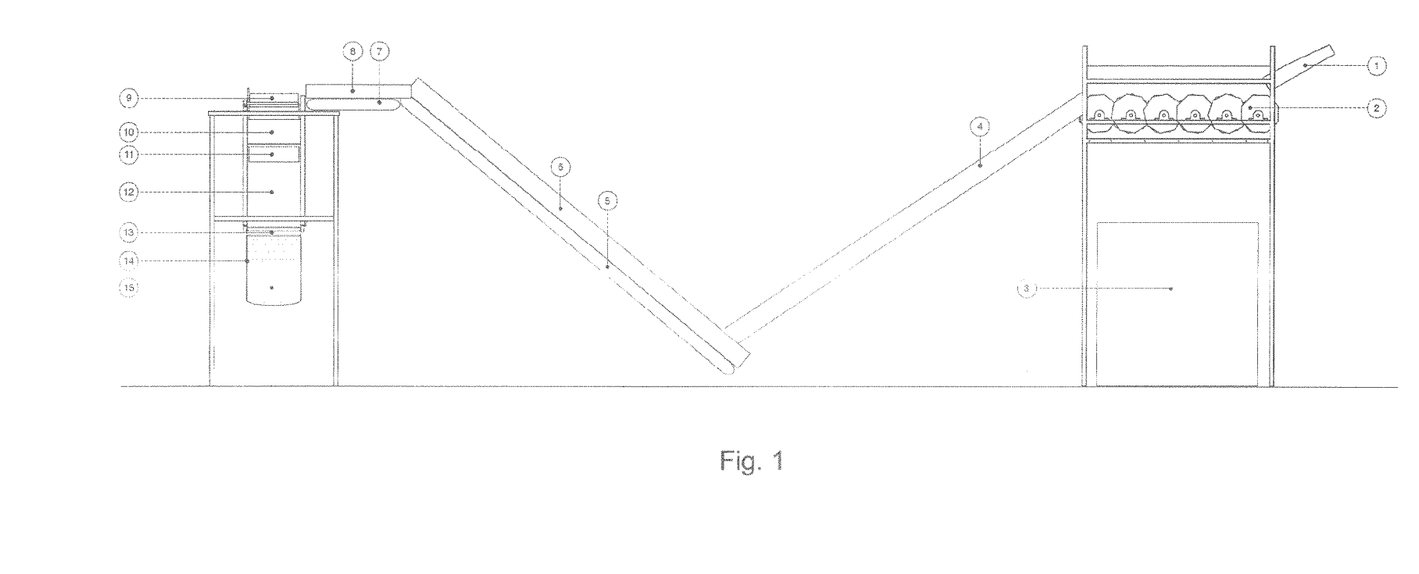
FIG. 1 shows an example apparatus for automatically preparing a bundle of wood for packing.

The wood packing apparatus is shown in elevation in FIG. 1. The wood in an example consists of split logs of roughly the same length, as typically provided for use as firewood intended for domestic wood burners and the like. It will be appreciated that the cross-sectional shape and size of the split logs can vary greatly. The wood packing apparatus is designed to allow for variation in cross-section whilst packing the wood efficiently into a defined volume. The apparatus works most effectively if all of the wood pieces are the same length. The apparatus can however cope with variations in length within the same batch of wood. The apparatus can also be arranged to have an adjustable mechanism so that to can handle batches of wood with larger or smaller maximum lengths of the wood. The wood will in general be roughly prismatic, although as it is a natural product then the shape will not be perfectly regular in a geometric shape. References below to the length of the wood pieces and to a lengthwise orientation are a reference to the longest dimension of the wood piece and to wood pieces aligned along the direction of this longest dimension. In general this will be the length of a roughly prismatic shape, which in the case of a split log will often be a prism with a cross-section that is roughly a sector of a circle.

Figure 2:
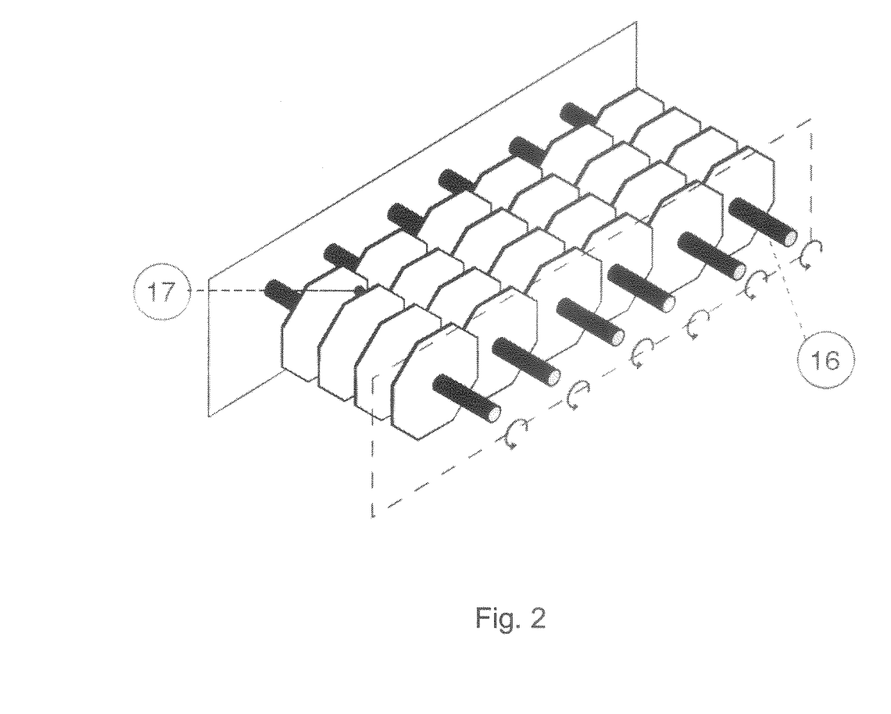
FIG. 2 is a diagram illustrating the arrangement of a waste extraction/wood cleaning machine used with the apparatus of FIG. 1.

The wood is supplied to the apparatus via a channel/slide/conveyor 1 or similar, which feeds logs into the waste extraction/wood cleaning machine 2. The waste extraction/wood cleaning machine 2 is for separating waste material, such as bark, dirt and wood chips, from the wood pieces. The waste extraction/wood cleaning machine 2 comprises of a sequence of axles 16 with rotors 17 that propel the wood pieces along whilst also agitating them with an up-and-down motion. FIG. 2 shows an example arrangement. The axles 16 are aligned generally horizontally and hence form a roughly horizontal surface along which the wood pieces are moved. This is in the direction of the arrows X in FIG. 2. The rotors 17 have an irregular (non-circular) shape, which in this example is an octagonal shape. Loose material that is attached to the logs is shaken off by the up and down motion. There are gaps between the rotors allowing the loose material to fall though the rotors 17 and axles 16 in the direction Y in FIG. 2 and into a container 3, which is beneath the waste extraction/wood cleaning machine 2 as shown in FIG. 1. The collected loose material, which might be predominately bark and small wood pieces, may be discarded or recycled. The rotors 17 in a preferred arrangement take the form of plates with irregular diameter, for example rotating octagonal plates as shown or alternatively hexagonal plates. The shape of the rotors 17 is not particularly limited but it may be an advantage to have sharp external corners, to help propel the wood pieces along, and it is also preferred to avoid internal curves or corners, since this can create a risk of jams. Circular rotors could be used and these would minimise the risk of jams. However, circular rotors will not generate such a large up-and-down motion for the wood and hence may not so effectively remove waste material.

In the preferred arrangement the wood pieces are aligned lengthwise across the axles, so that the axles are perpendicular to the length of the wood pieces and the wood pieces are transported along the length direction. It is also preferred for the rotational speed of the rotors to increase in the direction of travel. This can aid by increasing the separation of the wood pieces.

Figures 5, 6:
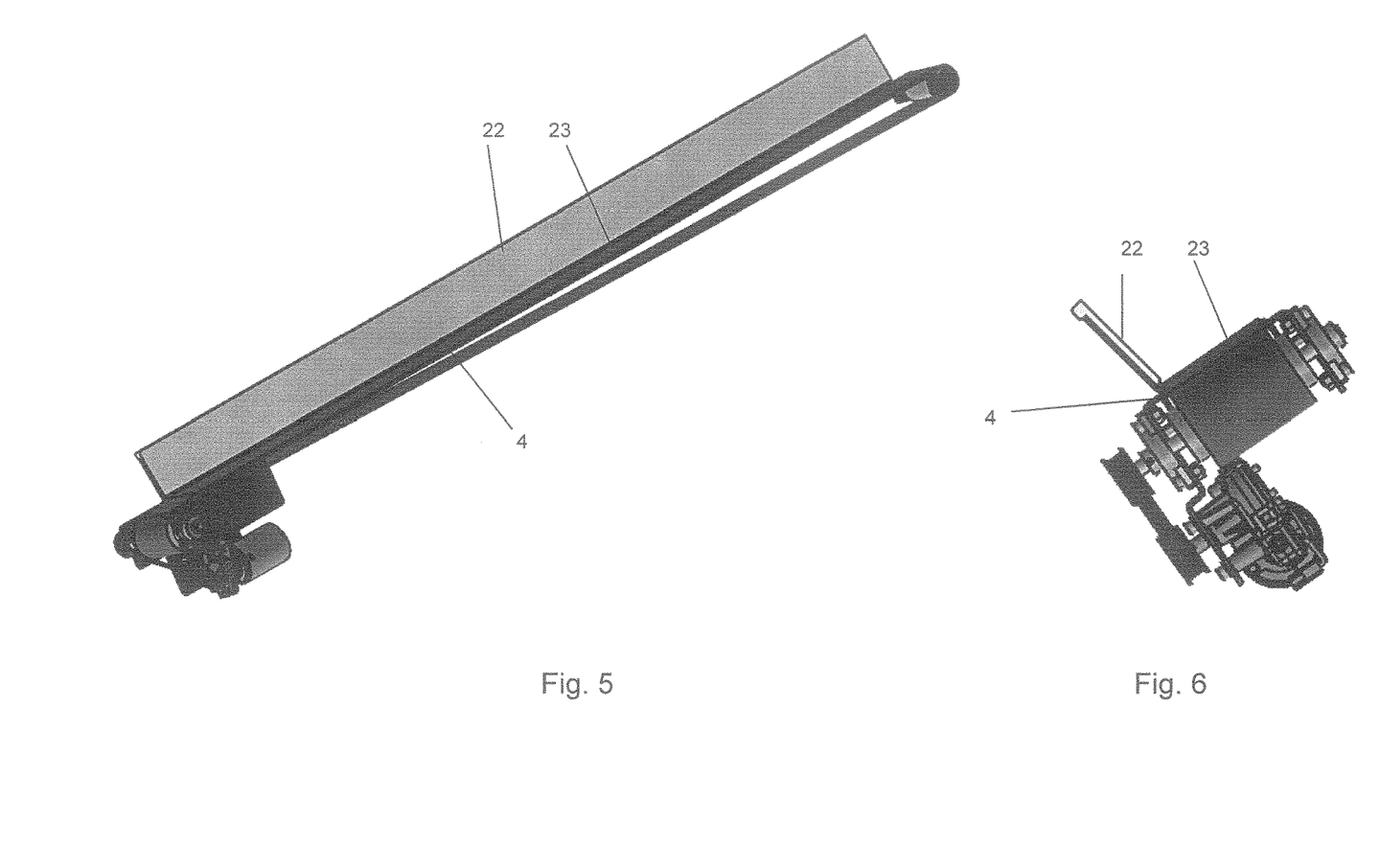

Referring again to FIG. 1, the waste extraction/wood cleaning machine 2 transports the wood pieces to a channel 4, where they are aligned lengthwise one-by-one. A guide plate may be present to guide the wood pieces from the waste extraction/wood cleaning machine 2 into the channel 4. The channel 4 is angled downwards from the waste extraction/wood cleaning machine 2 so that the logs slide down the channel 4. The cross-section of the channel 4 in a preferred arrangement is a V shape, with the width of the V being considerably less than the length of the wood pieces. This ensures that the wood pieces are correctly aligned. The channel 4 acts both to transport the wood pieces and also as a buffer to ensure that the next part of the apparatus is continually fed with wood. The channel 4 in this Figure allows sliding movement powered only by gravity and by the speed of the wood pieces entering the channel 4 from the waste extraction/wood cleaning machine 2. This channel 4 could however be replaced by a channel 4 using a conveyor mechanism as shown in FIGS. 5 and 6, for example.

Figure 3:
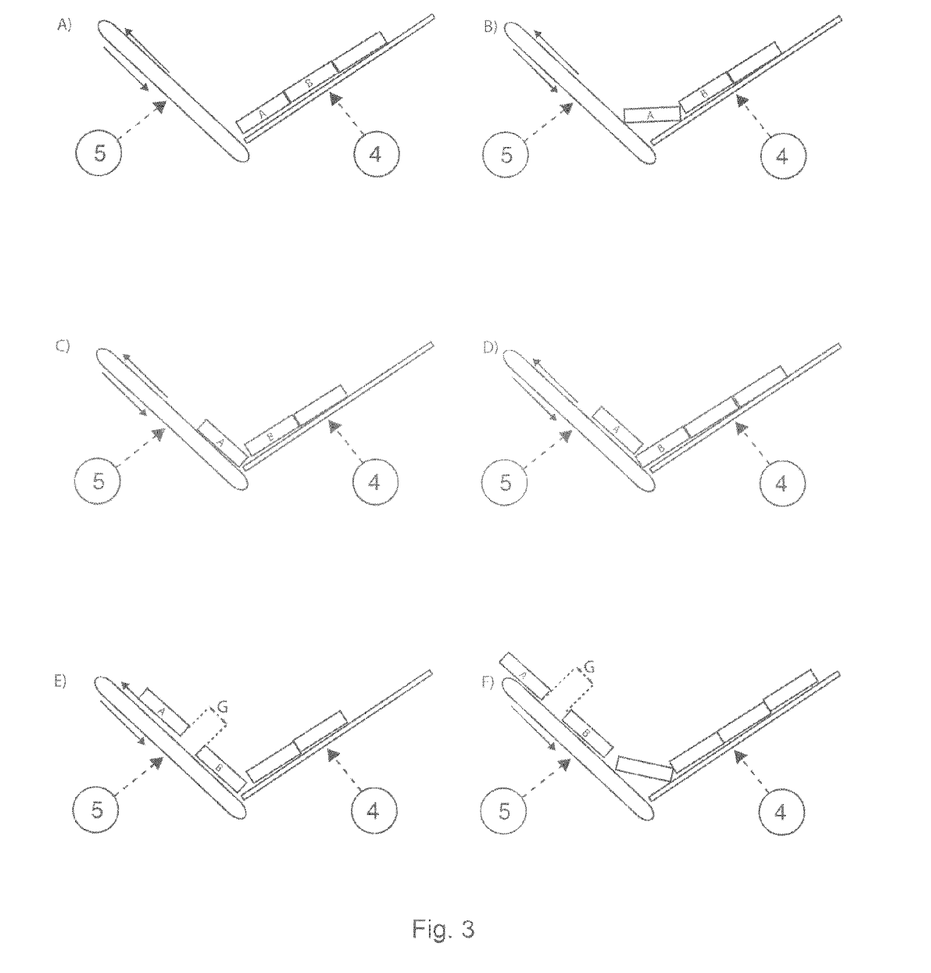
FIG. 3 shows the interaction of the downward channel and the upward conveyor in the apparatus of FIG. 1.

The channel 4 leads to a loading conveyor 5 with sidewalls 6. The conveyor 5 might use a belt or similar. The sidewalls 6, or equivalent rail or guide parts, ensure that the wood pieces remain in the lengthwise orientation whilst they are on the loading conveyor 5. The wood pieces are picked up one-by-one from the bottom of the channel 4 by the loading conveyor 5. Since the channel 4 is angled downward and the loading conveyor 5 is angled upward then the wood pieces are separated from each other as they are picked up by the loading conveyor 5. The separation is illustrated in FIG. 3 in the sequence (A) to (F) with schematic drawings that illustrate how a gap G is formed between consecutive wood pieces. When a first wood piece A is picked up by the conveyor 5 then the following piece B is blocked from contact with the loading conveyor 5 until the first piece A is fully loaded onto the loading conveyor 5 and has moved up the conveyor 5 to clear the height of the next piece B. The following piece B can then slide down the channel 4 and when it is picked up by the loading conveyor 5 there is a gap G between the first piece A and the subsequent piece B. A gap will be formed between all wood pieces in a similar way, since in each case a first piece will block a second piece until the first piece has moved up the conveyor. This gap is useful since it allows for separation of the wood pieces when they are passed to the next stage. With reference again to FIG. 1, the loading conveyor transports the wood pieces one by one up to a separating conveyor 7. Again this conveyor 7 has sidewalls 6 or similar in order to maintain the alignment of the wood pieces. The separating conveyor 7 operates with a greater speed than the loading conveyor 5 and consequently it increases the distance between the wood pieces. The wood pieces are transported one by one along the separating conveyor 7 and onto a loading hatch 9. The loading hatch 9 is part of a vertical packing machine for preparing a stack of wood pieces ready for bagging.

It should be noted that since the distance created as shown in FIG. 3 will vary dependent on the height of the wood pieces, then it can be important, when seeking to have a controllable time period between wood pieces to set the speed of the first conveyor accordingly. The minimum time interval between the wood pieces which are entering the packing machine is not dependent on the measured distance (length) between the wood pieces, but on the velocity of the loading conveyor 5. For example, assuming that there is no distance between the wood pieces then if the speed of the belt is 0.3 m/s and the wood pieces are an average of 0.3 m long, then one wood piece will reach the loading hatch every second. Decreasing the speed to 0.15 m/s would result in one wood piece reaching the loading hatch every 2 seconds. The greater velocity of the separating conveyor will increase the spatial distance between the wood pieces, but of course this does not affect the time period between the wood pieces.

The loading hatch 9 has a door preferably in the form of a pair of flaps opening downward and having a truncated V shape when closed. When a wood piece is slid onto the loading hatch 9 by the conveyor 7 and is detected by sensors, then the loading hatch 9 opens. The wood piece is dropped in a stable orientation into a buffer compartment 10. The buffer compartment 10 can hold several wood pieces acting as a buffer to temporarily store wood pieces whilst a lower stage of the vertical packing machine (described below) is unloading wood pieces into a bag. This avoids the need to stop the conveyors 5, 7 when a hatch 13 of the lower stage (measuring compartment) is opened.

The buffer compartment 10 is provided with a buffer compartment hatch 11 operating in a similar manner to the loading hatch 9. The buffer compartment hatch 11 is closed when the hatch of the lower stage is opened. As with the loading hatch 9, the buffer compartment hatch 11 enables the wood pieces to be dropped in a stable orientation. The buffer compartment hatch 11 preferably has a similar door with a pair of flaps opening downward with a V-shape.

Below the buffer compartment 10 is a lower stage having a measuring compartment 12 with room for typically 7.5 kg or 20 liters of wood pieces. The volume of wood packed using the example embodiment might be 75% wood and 25% air. Sensor(s), such as for example a weight sensor, detect when the measuring compartment 12 contains the required amount. This stops the buffer compartment hatch 11 from opening and opens a measuring compartment hatch 13. The measuring compartment hatch 13 may be similar to the hatches 9 and 11. The wood pieces are dropped in a stable orientation with the length of the wood pieces horizontal, and they fall into a bag rack 14. A net bag 15 or the like is fitted to the bag rack 14 and when this is disengaged and slid downwards off the bag rack 14 then it will be filled with the specified quantity of wood pieces, which will all be correctly oriented and which will be efficiently packed into the bag 15. The bag 15 can be filled in one step or in some cases the bag 15 may be filled in two stages. For example, with the measuring compartment mentioned above the apparatus may fill the bag with two 20 liter batches to reach 40 liters (approximately 15 kg of dry wood).

The bag 15 can be fitted and removed manually, or it can be done automatically.

The apparatus includes a controller or multiple separate controllers to receive inputs from sensors and to control the various mechanisms of the apparatus. Thus, the controller(s) may receive data from the sensor(s) at the measuring compartment 12 and from the sensor(s) at the loading hatch 9; and the controller(s) may control the loading hatch 9, the buffer hatch 11 and the measuring compartment hatch 13 so that the apparatus operates as described above. The controller(s) may also be connected to other systems in order to permit control of the conveyors 5, 7, the waste extraction machine 2 and so on during operation of the machine.

Figure 4:
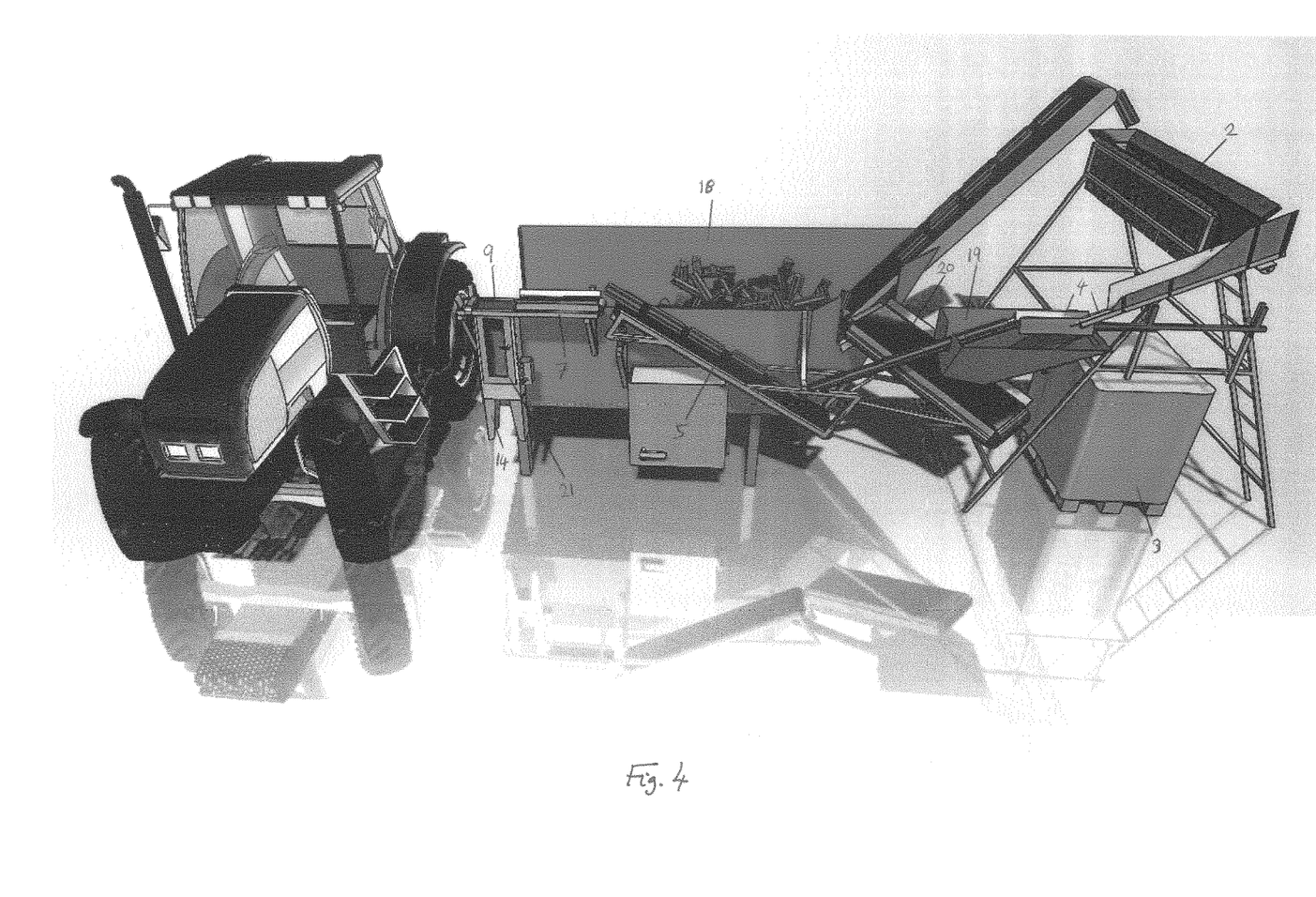
FIG. 4 shows another example apparatus for automatically preparing a bundle of wood for packing.

FIG. 4 shows another example of a wood packing device. This has the same basic parts and stages as the apparatus of FIG. 1. A loading hopper 18 is added, which ideally has sufficient capacity to keep the machine supplied for an hour or more before refilling is required. The loading hopper 16 supplies wood via a conveyor to the waste extraction/wood cleaning machine 2, which can be of similar design to that described above with reference to FIG. 2. The cleaned wood exits the waste extraction/wood cleaning machine 2 onto a channel 4.

The channel 4 of FIG. 4 has a different design to that of FIG. 1. In order to decrease the risk of multiple wood pieces sliding down the channel 4 together, and to provide additional spacing between wood pieces, the channel 4 has a first downwardly sloped portion followed by a flatter (less sloped, and optionally horizontal) section and then a second downwardly sloped portion. The flatter section and the second downwardly sloped section have lower sidewalls than the first downwardly sloped section. Should it occur that two wood pieces exit the waste extraction/wood cleaning machine 2 together and slide down the first downwardly sloped part of the channel 4 together, then these wood pieces will become separated at the flatter section, and all but one piece will fall off the sides. A hopper 19 and conveyor 20 return any falling pieces to the main hopper 18. Whilst this design cannot absolutely guarantee that the wood piece will slide down the second downwardly sloped section one-by-one, and arrive at the loading conveyor 5 one-by-one, it has been found that the risk of two wood pieces descending the channel 4 together is greatly reduced when the flatter section is introduced. The reduced height of the sidewalls in the flatter section and the second downwardly sloped section also increase the likelihood that the wood pieces will be aligned lengthwise one-by-one as they reach the loading conveyor 5.

As for FIG. 1 the channel 4 in FIG. 4 allows sliding movement powered only by gravity and by the speed of the wood pieces entering the channel 4 from the waste extraction/wood cleaning machine 2. Again, however, this channel 4 could be replaced by a channel 4 using a conveyor mechanism as shown in FIGS. 5 and 6, for example.

In the example of FIG. 4 the loading conveyor 5 interacts with the second downwardly sloped section of the channel 4 as shown in FIG. 3 for the channel 4 of FIG. 1. The loading conveyor 5 and the subsequent conveyor 7 are also similar to FIG. 1, and they supply the wood pieces one-by-one to the loading hatch door 9. In the example of FIG. 4 the device for filling the bags has a slightly different design to that of FIG. 1. The buffer compartment is dispensed with so that there are just two sets of hatches, the loading hatch 9 and the measuring compartment hatch 13. In this example the device for filling the bags has a side door 21, which can be opened for maintenance or to clear blockages if necessary. The wood pieces, when measured, are dropped into a bag (no shown in FIG. 4) held by the bag rack 14. The measuring compartment and/or the bag rack 14 advantageously taper outward toward the base, in order to minimise the risk of wood pieces becoming jammed. The bag rack 14 may have one hinged side to make it easier to but on an new bag, by pressing the hinged side towards the fixed side to make a cone as you pull up the bag. When the wood drops down, both the hatch moving to vertical position and the falling wood itself will help open the bag holder to full depth. The hinged side is also useful for avoiding jams and could be arranged to open beyond vertical so that there is an outward taper toward the base when the bag is filled.

It will be appreciated that these features of the device for filling the bags could be used, individually or in combination, with the FIG. 1 example. Likewise, the three-part channel 4 could also be used with the apparatus of FIG. 1.

FIGS. 5 and 6 show another alternative design for the channel 4 that conveys the wood pieces from the waste extraction/wood cleaning machine 2 to the upwardly sloped conveyor 5. In this case the channel 4 is a V shaped conveyor channel 4 comprising a static wall 22 and a conveyor wall 23 at an angle to each other meeting at the vertex of the V shape. The use of an arrangement where the wood pieces are partly supported by the static wall 22 and partly supported by the conveyor that forms the conveyor wall 23 has been found to give low enough friction not to force wood pieces onto the subsequent upwardly sloped conveyor 5 before a gap is formed, whilst also acting to move the wood pieces along as they exit the waste extraction/wood cleaning machine 2 in order to thereby ensure that the logs stack end-to-end. By providing some mechanical assistance to movements of the wood pieces along the V shape channel 4 it can also become possible to increase the speed at which the wood pieces pass through the system, which allows for quicker packing of the wood pieces. As noted above the V shape conveyor channel 4 of FIGS. 5 and 6 can be used with the apparatus of FIG. 1 or the apparatus of FIG. 4.

The invention claimed is:

1. An apparatus for preparing wood for packing, wherein the wood consists of wood pieces having a length and a cross-section with smaller dimensions than the length, the apparatus comprising:
   a loading mechanism for loading wood lengthwise onto a conveyor system;
   a hatch for receiving wood pieces one-by-one from the conveyor system; and
   a measuring compartment for receiving wood pieces dropped through the hatch;
   wherein the conveyor system is for conveying the wood pieces one-by-one onto the loading hatch in a predetermined orientation;
   wherein the apparatus is arranged so that when a wood piece is fully on the loading hatch, then the loading hatch is opened and drops the wood piece in the predetermined orientation into the measuring compartment; such that the measuring compartment can be filled with multiple wood pieces stacked in the same orientation when the conveying and dropping process is repeated; and
   wherein the measuring compartment is operable so that, when a required amount of wood is stacked within the measuring compartment, the stacked wood pieces are dropped into a packing area.

2. An apparatus as claimed in claim 1, comprising a channel for lengthwise sliding of the wood pieces to load the conveyor system, wherein the channel is shaped to guide the wood pieces and prevent them from leaving the lengthwise orientation.

3. An apparatus as claimed in claim 2, wherein the channel is downwardly sloping V-shaped channel.

4. An apparatus as claimed in claim 2, wherein the channel is a V shaped conveyor channel wherein one wall of the V is a static wall and the other wall of the V is a conveyor wall.

5. An apparatus as claimed in claim 2, wherein the channel has a first downwardly sloped section, followed by flatter, less sloped section, and then followed by a second downwardly sloped section.

6. An apparatus as claimed in claim 1, wherein the conveyor system is arranged for maintaining a lengthwise alignment of the wood pieces and for separating the wood pieces from one another so that there is a gap between the trailing end of a first wood piece and the leading end of a second wood piece.

7. An apparatus as claimed in claim 5, wherein the conveyor system includes a first, loading conveyor operating at a first speed, with a second separating conveyor operating at a second speed, the second speed being higher than the first speed.

8. An apparatus as claimed in claim 1, wherein a or the downwardly sloping channel is provided for loading the conveyor system, wherein the wood pieces are slid along the channel and wherein the conveyor system begins with a conveyor that is slanted at an upward angle in the direction of travel.

9. An apparatus as claimed in claim 1, wherein a or the downward channel is provided for loading lengthwise wood pieces onto a first, loading, conveyor, wherein the loading conveyor is for passing the wood pieces to a second, separating conveyor in order to increase the spacing, and wherein the separating conveyor operates at a higher speed than the loading conveyor.

10. An apparatus as claimed in claim 1, including a buffer compartment beneath the loading hatch and above the measuring compartment, wherein the buffer compartment is for temporary storage of any wood pieces that are passed along the conveyor system and through the loading hatch after the required quantity of wood is stacked in the measuring compartment.

11. An apparatus as claimed in claim 10, wherein the apparatus is arranged so that the buffer compartment stores wood pieces when the measuring compartment has been filled with the required amount of wood, and releases the stored wood pieces from the buffer compartment into the measuring compartment once the measuring compartment has emptied the previous batch of stacked wood pieces into the packaging area.

12. An apparatus as claimed in claim 10, wherein the buffer compartment includes a hatch for opening and closing the compartment and the apparatus is arranged to close the buffer compartment hatch when the measuring compartment has been filled with the required amount of wood, and then to open the buffer compartment hatch when the measuring compartment has been emptied and is ready for the next batch.

13. An apparatus as claimed in claim 1 wherein the predetermined orientation of the wood pieces is a lengthwise orientation such that a door of the loading hatch opens along a hinge that is generally parallel with the length of the wood piece.

14. An apparatus as claimed in claim 1, wherein the loading hatch has a door comprising two flaps opening in a V-shape.

15. An apparatus as claimed in claim 1, comprising a waste extraction machine for removing waste from the wood pieces before they are loaded onto the conveyor system, and a hopper for supplying wood to the waste extraction machine; wherein the waste extraction machine is for supplying wood pieces to the conveyor system, and wherein the waste extraction machine is arranged to provide a preliminary separation of the wood pieces to allow them to be loaded in a lengthwise orientation without risk of jamming.

16. An apparatus as claimed in claim 15, wherein the waste extraction machine comprises a conveyor with voids along the conveyor for waste material to fall through, wherein the conveyor is arranged to agitate the wood pieces as they travel along it.

17. An apparatus as claimed in claim 15, wherein the waste extraction machine comprises non-circular rotors spaced apart along a sequence of axles, and wherein the rotors rotate to propel the wood pieces along the machine from axle to axle, and also act to bounce the wood pieces up and down due to the non-circular shape.

18. An apparatus as claimed in claim 15, wherein the waste extraction machine comprises rotors spaced apart along a sequence of axles and the axles further along in the direction of travel rotate more quickly than the axles further back in the direction of travel.

19. A method of preparing wood for packing, wherein the wood consists of wood pieces having a length and a cross-section with smaller dimensions than the length, the method comprising:
    loading wood lengthwise into a conveyor system;
    conveying the wood pieces one-by-one onto a loading hatch in a predetermined orientation;
    when a wood piece is fully on the loading hatch, opening the loading hatch and dropping the wood piece in the predetermined orientation into a measuring compartment;
    repeating the conveying and dropping process so that multiple wood pieces are stacked in the same orientation in the measuring compartment; and,
    when a required amount of stacked wood is within the measuring compartment, dropping the stacked wood pieces into a packing area.

20. A method as claimed in claim 19, wherein the method comprises using an apparatus comprising:
    a loading mechanism for loading wood lengthwise onto a conveyor system;
    a hatch for receiving wood pieces one-by-one from the conveyor system; and
    a measuring compartment for receiving wood pieces dropped through the hatch;
    wherein the conveyor system is for conveying the wood pieces one-by-one onto the loading hatch in a predetermined orientation;
    wherein the apparatus is arranged so that when a wood piece is fully on the loading hatch, then the loading hatch is opened and drops the wood piece in the predetermined orientation into the measuring compartment; such that the measuring compartment can be filled with multiple wood pieces stacked in the same orientation when the conveying and dropping process is repeated; and
    wherein the measuring compartment is operable so that, when a required amount of wood is stacked within the measuring compartment, the stacked wood pieces are dropped into a packing area.

* * * * *